(12) United States Patent
Peters et al.

(10) Patent No.: US 10,724,894 B2
(45) Date of Patent: Jul. 28, 2020

(54) BAD WATER DISCHARGE FOR WEIGHING SYSTEMS

(71) Applicant: Multipond Wägetechnik GmbH, Waldkraiburg (DE)

(72) Inventors: Andreas Peters, Aschau am Inn (DE); Markus Spateneder, Pleiskirchen (DE)

(73) Assignee: MULTIPOND WÄGETECHNIK GMBH, Waldkraiburg (DE)

( * ) Notice: Subject to any disclaimer, the term of this patent is extended or adjusted under 35 U.S.C. 154(b) by 175 days.

(21) Appl. No.: 15/970,005

(22) Filed: May 3, 2018

(65) Prior Publication Data
US 2018/0321076 A1    Nov. 8, 2018

(30) Foreign Application Priority Data
May 3, 2017 (DE) .................... 20 2017 002 310 U

(51) Int. Cl.
| | | |
|---|---|---|
| *G01G 23/00* | (2006.01) | |
| *G01G 17/06* | (2006.01) | |
| *G01G 21/22* | (2006.01) | |
| *G01G 21/28* | (2006.01) | |
| *G01G 13/00* | (2006.01) | |

(Continued)

(52) U.S. Cl.
CPC .......... *G01G 13/006* (2013.01); *G01G 17/06* (2013.01); *G01G 21/22* (2013.01); *G01G 21/28* (2013.01); *G01G 23/00* (2013.01); *F25D 21/14* (2013.01); *G01G 13/024* (2013.01)

(58) Field of Classification Search
CPC ...... G01G 23/00; G01G 13/006; G01G 17/06; G01G 21/22; G01G 21/28; G01G 13/024; F25D 21/14

USPC ........................................................ 177/180
See application file for complete search history.

(56) References Cited

U.S. PATENT DOCUMENTS

| 4,444,283 A | * | 4/1984 | Mikami | ................. | G01G 21/28 |
| | | | | | 177/128 |
| 5,765,655 A | * | 6/1998 | Tatsuoka | ................ | G01G 13/16 |
| | | | | | 177/105 |

(Continued)

FOREIGN PATENT DOCUMENTS

DE          8801400 U1     4/1988

OTHER PUBLICATIONS

Search Report dated Oct. 19, 2017, in German Application No. 20 2017 002 310.5 (4 pages).

*Primary Examiner* — Jacques M Saint Surin
(74) *Attorney, Agent, or Firm* — Womble Bond Dickinson (US) LLP; John J. Penny, Jr.

(57) ABSTRACT

A bad water discharge system for a weighing system, wherein the weighing system comprises a distribution plate, at least one feeding device; at least one reserve container, at least one weighing container and at least one collection funnel, wherein the at least one reserve container and the at least one weighing container are fixed to a cage and the at least one collection funnel is fixed to a frame. For the bad water discharge system, at least one feeding device discharge plate is disposed at a lower side of the feeding device so that it leads bad water away from at least one reserve container to a sidewall of the cage, and so that the bad water originating from an upper side of the cage and from the lower side of the feeding device is bundled into one flow and is collected below the cage in suitable collection devices.

18 Claims, 21 Drawing Sheets

(51) Int. Cl.
*F25D 21/14* (2006.01)
*G01G 13/02* (2006.01)

(56) References Cited

U.S. PATENT DOCUMENTS

| | | | |
|---|---|---|---|
| 6,365,845 B1 * | 4/2002 | Pearce | G01G 19/393 |
| | | | 177/180 |
| 9,033,129 B2 * | 5/2015 | Taylor | G01G 19/393 |
| | | | 177/25.18 |
| 9,422,072 B2 * | 8/2016 | Kikuchi | B65B 5/06 |
| 2016/0362241 A1 | 12/2016 | Morimoto et al. | |
| 2016/0370222 A1 | 12/2016 | Morimoto et al. | |

* cited by examiner

BAD WATER DISCHARGE FOR WEIGHING SYSTEMS

The present application claims priority under 35 U.S.C. § 119 to German Patent Application No. 20 2017 002 310.5 filed on May 3, 2017 in Germany, the disclosure of which is incorporated herein by reference.

The present application relates to a system for bad water discharge for hygienically designed weighing systems.

Present weighing systems can be used in the wet operation mode and in the dry operation mode. Wet operation mode means that products are processed and weighed which have a certain degree of humidity and hence contain water. In the dry operation mode, mostly dry products are processed.

In particular for the wet operation mode, undesired water can accumulate at certain, exposed positions in the weighing system. In the following, this water is called bad water, as it can be contaminated. This can, however, also be the case for the dry operation mode, for example in the form of condensed water from the room air.

Water and humidity can also accumulate in a weighing system because of the following reasons:

1. Due to cool product, which is conveyed in a weighing system via a distribution plate and dosing channels, condensed water can be formed both at the product and on the distribution plate and the feeding devices or dosing channels, which are also cooled by the cool product. Condensed water herein preferably forms on the lower surface of distribution plates and feeding devices or dosing channels.

2. Furthermore, remainders can accumulate on parts of the weighing system after a wet cleaning, which is necessary or often also prescribed by law for the use in the food industry or food processing industry. Remainders of a wet cleaning are for example water drops or remainders of product and cleaning agents, which still adhere to the machine and have not yet dried.

3. Furthermore, also liquids which are transported with the product (for example brine for mozzarella) can be deposited on the weighing system. Liquids which are transported with the product can drip from product-conducting parts to other parts of the machine.

Furthermore, it is possible that all three above-mentioned kinds of the bad water generation simultaneously occur. A weighing system can be separated into a product-conducting area (A-area) and an area facing away from the product (B-area).

Weighing systems according to prior art usually have horizontal areas on the upper and the lower side of a cage. Bad water herein per se cannot run off, as no defined draining direction is preset. Furthermore, the dripping edge between the upper surface of the cage and a mounting surface for the weighing container slots is often designed in an unhygienic way in weighing systems according to prior art, so that also there water and contaminations can accumulate.

By an edge projecting to the outer side on the upper side of the cage, an additional surface can be formed, and thereby also an unhygienic inner edge, on which remainders can easily accumulate, which can only very badly be removed from there because of the bad accessibility of the inner edge. Furthermore, this additional surface is also horizontal, being the reason why water cannot be drained by itself from there.

Feeding devices or dosing channels for weighing systems in the prior art are often designed in a way that water, which forms at a lower side of these, flows in the direction of reserve containers and drips into them. As the reserve containers belong to the A-area (product-conducting area), product can be very easily contaminated in this manner. Furthermore, water can directly drip onto a lever mechanism of the container and then into the weighing containers per se. Due to the geometrical circumstances, water which however drips onto the outer side of the weighing containers and on the cage in the downward direction, flows or falls into the collection funnel or collection funnels, in which product is transported. Herein, an easy contamination of product is possible also in this case.

If contaminated water from the B-area (area facing away from the product) flows backward to the A-area (product-conducting area), there is a very high risk of the contamination of the product via remainders of cleaning agent, micro-organisms which form in shortest time, dust and small and large remainders of product. In particular, pathogens like salmonella, staphylococcus, listeria, clostridia and mold fungus can easily lead to the spoiling of food in the food industry or food-processing industry. This can easily lead to a food poisoning of the consumer.

For this reason, a well-functioning bad water discharge system is essential for a hygienically designed weighing system.

In prior art, a ring-shaped wall is known from US 2016/0362241 A1, which is mounted on the lower side of a distribution plate of a weighing system, wherein this ring-shaped wall is intended to lead to the bad water flow at the lower side of the distribution plate away from the product.

Furthermore, a cover of reserve containers and covers for a partial area of chutes and funnels of a weighing system are known from US 2016/0370222 A1, which also should keep away bad water from the product.

Herein, however, furthermore the problem occurs that not all product-conducting areas are comprised by a common bad water discharge concept.

The present application, hence, is based on the problem to create a water discharge or bad water discharge concept, which fulfils hygienic requirements. Herein, bad water should be discharged in a way that no contamination of the product or all product-conducting parts occurs. Herein, a B-area (area facing away from products), in which lower requirements (with regard to the surface roughness, frequency of cleaning, de-mountability, design of edges and welding seam processing) apply for the hygienic design compared to the A-area (product-conducting area), should be created.

It is hence an objective technical problem of the present invention to discharge bad water which is in a whole B-area (area facing away from the product), and hence prevent a back-flow into an A-area (product-conducting area) in a constructively safe manner.

This objective technical problem is solved by a bad water discharge system according to claim 1. Further preferable embodiments of the invention are subject-matter of the dependent claims.

The invention contains a bad water discharge system for a weighing system, wherein the weighing system comprises a distribution plate and at least one feeding device, which convey product into at least one reserve container, from which the product can fall into at least one weighing container and then in at least one collection chute, wherein the at least one reserve container and the at least one weighing container are mounted to a cage and the at least one collection funnel is fixed to a frame, wherein the cage has inclined upper and lower surfaces, at least one feeding device-discharge plate is provided on the lower side of the feeding device, which leads bad water away from the at least one reserve container and leads it to the side wall of the cage, so that the bad water deriving from the upper surface of the cage and from the lower surface of the feeding device can be bundled into one flow and can be collected and discharged in suitable collection means below the cage, which are provided above the collection funnel, so that no bad water can get into the collection funnel.

Different embodiments of collecting devices are possible.

In a first embodiment, at least one collection chute and one essentially central collection container are provided as collection means, wherein the at least one collection chute is obliquely pivoted with regard to the central collection container. Preferentially, the collection chutes overlap each other. Pivoted discharge channels lead out of the essentially central collection container and lead bad water to the outside. Preferably, these pivoted discharge channels are positioned below the frame arms of the frame, so that they also can collect water dripping from those and can discharge it.

In a second embodiment, several tubular chutes are provided as collection devices, which are respectively fixedly connected with a bulkhead plate, for example via a flange or by welding. The bulkhead plates are obliquely pivoted to the outside, so that water is discharged. The bulkhead plates overlap, so that water can get into the funnel in no case, and rest on the collection funnel of the weighing system. Further, a central cover is provided, which lies on the bulkhead plates. Water which drips onto the cover is conveyed to the bulkhead plates. A unit of tubular chute and bulkhead plate can be removed for cleaning purposes.

In a third embodiment, lateral collection container and optionally a basically central collection container are provided as collection means. The lateral collection containers and the central collection container can regularly be taken out in continuously short intervals by the operating personnel and can be emptied.

Further, a funnel flange, which can be connected to a drip tray, can be combined with all embodiments. The drip tray, which is pivoted to the outside, secures components and machines below the weighing device from bad water.

Furthermore, hygienically designed slide bearings can be used in all embodiments. These contain flush drillings in bearing bushes in order to flush out bad water and remainders. Hereby, circumferential drillings are present, by which the bearings can be cleaned with cleaning water.

Furthermore, a pivoted step can be used in all embodiments, which can be mounted to the frame. Also from this, water can drip or flow off well.

Furthermore, a protective roof can be provided above the weighing system in all embodiments, which prevents that dirt particles can fall into the weighing system from above.

In the following, both the prior art and preferred embodiments of the present invention are explained more in detail with reference to the enclosed figures.

Figure 1:
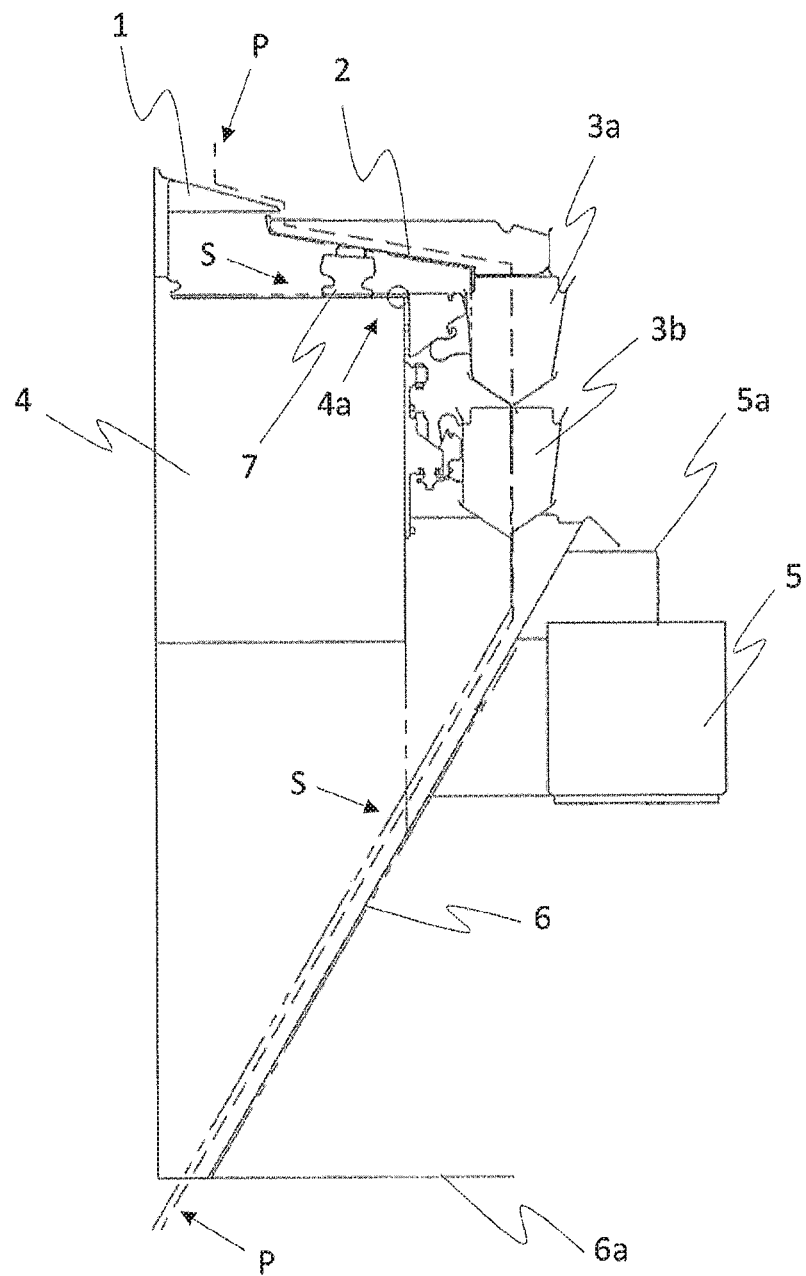
FIG. 1 shows a cross-sectional view of a combination scale according to prior art.

In FIG. 1, a combination scale according to prior art is presented more in detail. In the cross-sectional view, a distribution plate 1 with a feeding device 2 is shown. These lead into a reserve container 3a, below which a weighing container 3b is mounted. Goods from the weighing container 3b can fall onto a collection funnel 6, which directs them downwards. In particular, the collection funnel 6 is fixed to a frame 5 via a frame arm 5a. Furthermore, a cage 4 with straight upper and lower edge is present in the middle of the combination scale, wherein the cage 4 contains a dripping edge 4a at the upper edge. Via a connection device 7, the feeding device 2 is fixed to the cage 4. Furthermore, the product flow P is presented via a dashed line in FIG. 1, and the bad water flow S is presented via an alternatingly dashed line. Herein it becomes obvious that in particular in the collection funnel 6, the product flow P and the bad water flow S coincide: the product flow leads over the distribution plate 1 via the feeding device 2 through the reserve container 3a and the weighing container 3b via the collection funnel 6 downwards. The bad water flow, for example, derives by dripping of condensed water from the feeding device 2 and proceeds over the upper edge of the cage 4 and the dripping edge 4a, and then along the lateral edge of the cage 4 downwards to the collection funnel 6.

From FIG. 1, it becomes obvious that the upper surface and the lower surface of the cage 4 extend horizontally. Therefore, there is no defined discharge direction for the bad water flow S. Bad water which flows from the upper surface of the cage 4 gets to the dripping edge 4a. This dripping edge 4a is designed in a way that contaminations can accumulate. As the lower side of the dripping edge 4a is horizontal, water can also accumulate there. Bad water which accumulates at the lower surface of the feeding device 2 flows to the outer side and hence can for example get into the reserve container 3a, whereby product can be contaminated. As also the upper surface of the frame 5 extends horizontally, also water accumulating thereon has no defined water discharge direction. Furthermore, bad water which drops or flows on the cage 4, flows into the funnel 6, whereby product is contaminated as well. Bad water, which, however, forms on the outer side of the funnel 6, flows downwards to a funnel flange, where also contaminations can accumulate. As also the drip tray 6a is aligned horizontally on the funnel 6, no defined water discharge direction is present either. Furthermore, contaminations falling from above, as for example from the ceiling of a fabrication hall, can additionally contaminate the product.

Altogether, it becomes obvious that for the combination scale as presented in FIG. 1, the bad water is not consequently discharged or led away from the scale or is kept away from the product. Herein, there is no differentiation between an A-area (product-conducting area) and the B-area (area facing away from the product).

Figure 2:
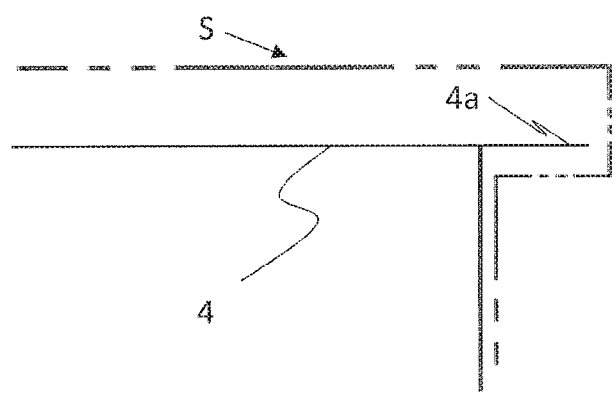
FIG. 2 shows a detailed view of a dripping edge of an upper surface of the cage in a combination scale according to the prior art.

In FIG. 2, the upper surface of the cage 4 with a dripping edge 4a is presented more in detail. Furthermore, the bad water flow S is presented, which leads around the dripping edge 4a. Hence, contaminations can very easily accumulate there, and a defined water discharge direction is not present.

Figure 3:
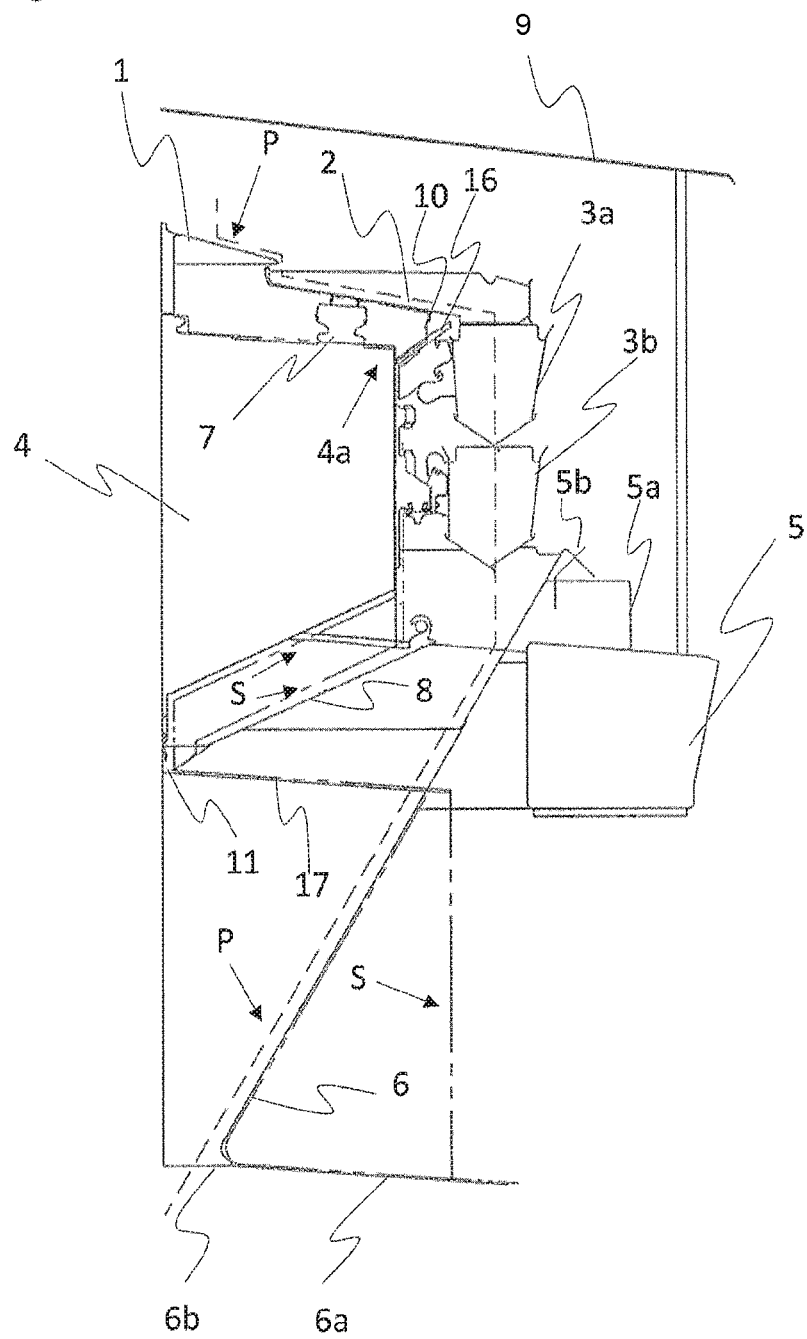
FIG. 3 shows a cross-sectional view of a combination scale according to a first embodiment of the present invention, provided with protective roof, feeding device-discharge plate, reserve container holder, collection chutes, central collection container, discharge channels, hygienic flange connections and drip tray.

FIG. 3 shows a cross-sectional view of an inventive first embodiment of a combination scale with hygienic bad water discharge. Herein, a pivoted protection roof 9 is present, by which contaminations falling down, for example from the ceiling of a fabrication hall, are kept away from the product. The arrangement of the distribution plate 1, the feeding device 2, the reserve container 3a, the weighing container 3b, the collection funnel 6 and the connection device 7 are equal to the embodiment of the prior art as shown in FIG. 1.

However, the dripping edge 4a is designed without projection. Furthermore, it is shown in FIG. 3 that the upper surface and the lower surface of the cage 4, the upper surface of the frame arm 5a, the lower side of the frame arm 5a, and the upper surface and the lower surface of the frame 5 are designed with pivoted, i.e. non-horizontal areas, and that reserve container holder 16 is designed in an oblique way, so that water can flow away more easily. A discharge plate 5b leads water away from the frame. Furthermore, collection chutes 8 are mounted above the funnel 6, which are mounted to the frame arm 5a with a collection chute holder 8a. Furthermore, a basically central collection container 11 is present, which basically collects bad water from all collection chutes 8.

Furthermore, at the end of the feeding device 2, a feeding device-discharge plate 10 is mounted, which changes the direction of bad water, which, for example, could flow at the lower surface of the feeding device 2 into the reserve container 3, so that it is also collected by the reserve container holder 16 and hence is collected by the collection chute 8. The liquid is, more in detail, led via a reserve container holder 16 to the cage 4 and then, together with the bad water flow S which comes from the upper surface of the cage 4, to the collection chutes 8. Furthermore, bad water from the lower surface of the cage 4 and the collection chutes 8 is collected in a collection container 11. From the collection container 11, the bad water is led to the outside via discharge channels 17, which are arranged below frame arms 5a.

Furthermore, it is clear that water which is formed at the outer side of the collection funnel 6, is led via a hygienic funnel flange 6b to a pivoted drip tray 6a. Subsequently, the bad water can leave the area of the scale without contaminating the product. Hence, there is a clear delimitation between the product-conducting area and the area leading away from the product.

Furthermore, it is visible from FIG. 3 that the product flow P is as described in FIG. 1, however, the bad water flow S is different: Both from the lower surface of the feeding device 2 and from the upper surface of the cage 4, bad water flows along a side of the cage 4 to be collected by collection chutes 8 and to be led to a collection container 11. From there, the bad water is led to the outside of the combination scale via discharge channels 17, where it coincides with the bad water which is formed at the outer side of the funnel 6.

Figure 4:
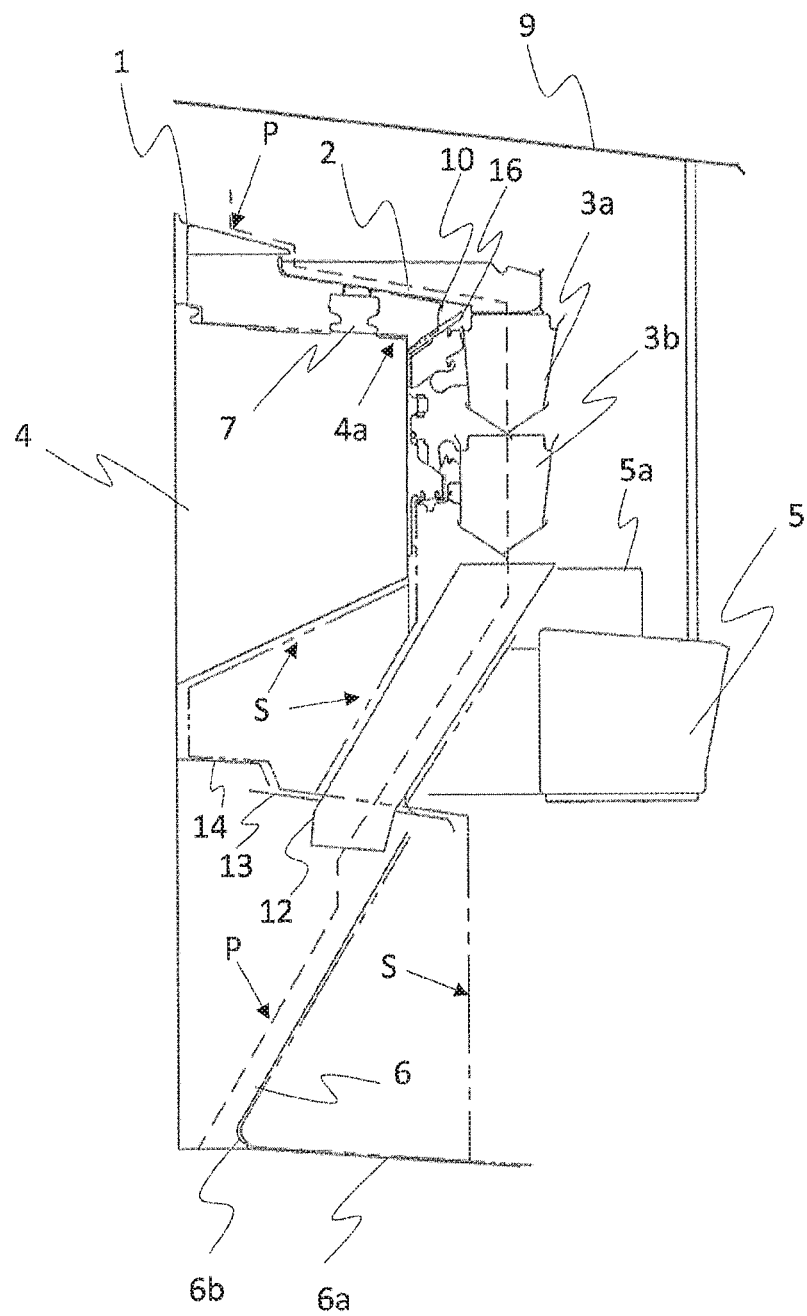
FIG. 4 shows a cross-sectional view of a combination scale according to a second embodiment of the present invention, provided with protective roof, feeding device-discharge plate, reserve container holder, tubular chutes, bulkhead plates, hygienic flange connections and a drip tray.

FIG. 4 shows a further embodiment of the present invention. The arrangement of distribution plate 1, feeding device 2, reserve container 3a, weighing container 3b, cage 4, frame 5, frame arm 5a, funnel 6, drip tray 6a and funnel flange 6b and connection device 7, protection roof 9, reserve container holder 16 and the feeding device-discharge plate 10 is the same or similar compared to the first embodiment.

However, tubular chutes 12 are used in the second embodiment in order to save the product, and bulkhead plates 13 are used in order to lead away or collect bad water.

Each tubular chute 12 is respectively fixedly connected with a bulkhead plate 13. Herein, the tubular chute 12 and the bulkhead plate 13 can be demounted as unit for cleaning purposes. In the middle, there is a central cover 14, which is also removable. The bulkhead plates 13 as well as the central cover 14 are also pivoted to the outer side, so that bad water accumulating on the bulkhead plates 13 can flow outwards, i.e. into the area outside of the collection funnel 6.

The product flow P is the same compared to the first embodiment (cf. FIG. 3), wherein the product is transported through the tubular chutes 12 in a protected manner.

The bad water flow S initiates firstly on the upper surface of the cage 4, and secondly on the lower surface of the feeding device 2, which is then however led to the reserve container holder 16 via the feeding device-discharge plate 10. Both bad water flows flow together along the side area of the cage 4, and the combined bad water flow then flows either along the pivoted lower surface of the cage 4 directly to the central cover 14 and from there via the bulkhead plates 13 to the outside, or drips down on the cage and is then directed from the outer side of the tubular chutes 12 onto the bulkhead plates 13 and then to the outside.

Figure 5:
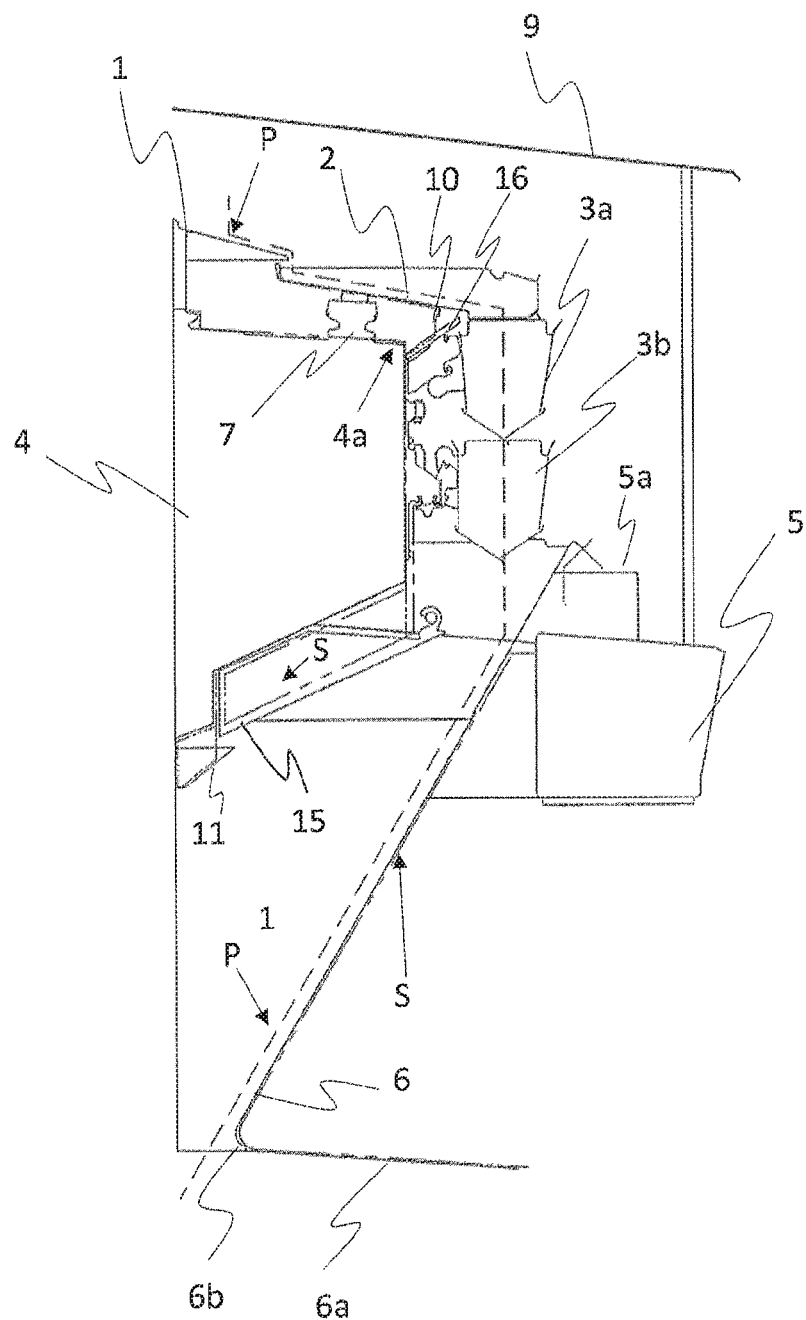
FIG. 5 shows a cross-sectional view of a combination scale according to a third embodiment of the present invention, provided with protective roof, feeding device-discharge plate, reserve container holder, lateral collection containers and central collection container, hygienic flange connections and drip tray.

In FIG. 5, a third embodiment of the present invention is shown.

The arrangement of distribution plate 1, feeding device 2, reserve container 3a, weighing container 3b, cage 4, frame 5, frame arm 5a, discharge plate 5b, funnel 6, drip tray 6a, and funnel flange 6b, connection device 7, protection roof 9, feeding device-discharge plate 10, reserve container holder 16, as well as the collection chute holder 8a is the same or similar compared to the first embodiment.

In this embodiment, lateral collection containers 15 are used. A central collection container 11 is, however, further present. Both the lateral collection containers 15 and the central collection container 11 are designed as containers without drain pipe. The lateral collection containers 15 as well as the central collection container 11 are removable for draining purposes. Bad water which cannot be collected via the lateral collection containers 15 is collected by the collection container 11. The product flow P is equal to the first and second embodiment. The bad water flow S is equal compared to the first and second embodiments up to the sidewall of the cage 4, is, however either collected by the lateral collection containers 15 or the collection container 11 in this embodiment. With regard to the bad water flow S at the outer side of the funnel 6, this is equal compared to the first and second embodiments.

Figure 6:
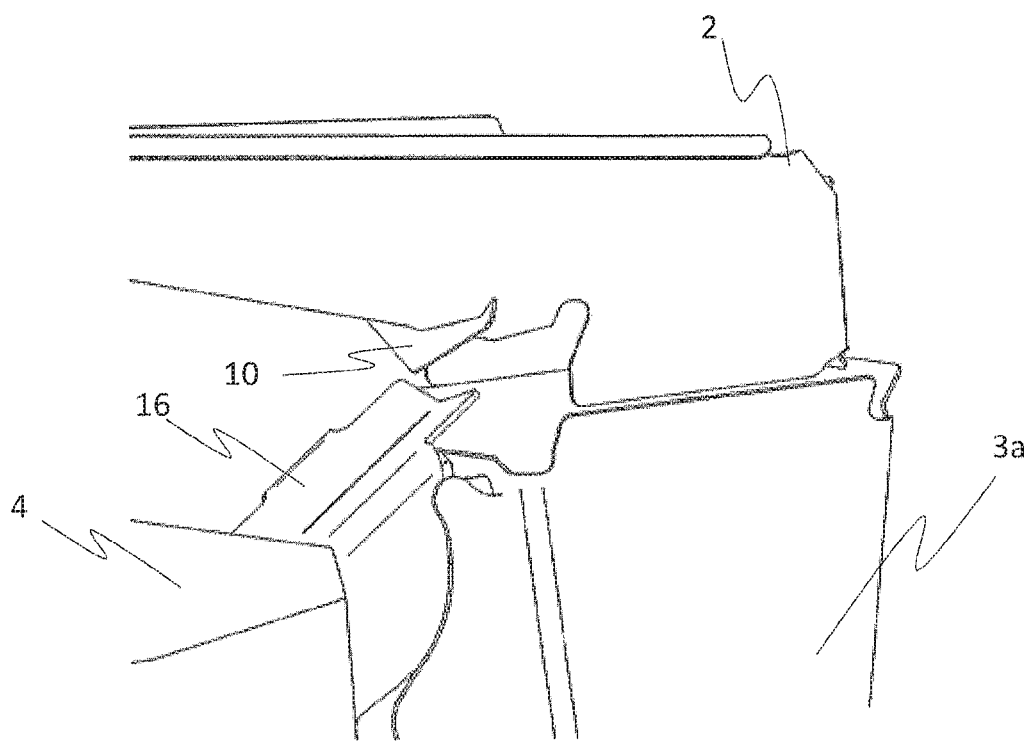
FIG. 6 shows a view of a reserve container with holder, a feeding device and a discharge plate fixed thereto.

FIG. 6 shows an embodiment of a feeding device-discharge plate 10. At the lower surface of the feeding device 2, the feeding device discharge plate 10 leads the bad water to the reserve container holder 16, which is pivoted to the cage 4, so that it cannot get into the reserve container 3a. The feeding device-discharge plate 10 has its deepest point in the middle above the reserve container holder 16. From the reserve container holder 16, bad water is led to the cage. Bad water can be targetedly discharged in this way, as it flows along a side wall of the cage 4. The reserve container holder 16 has furthermore a distance from the cage 4.

Figure 7:
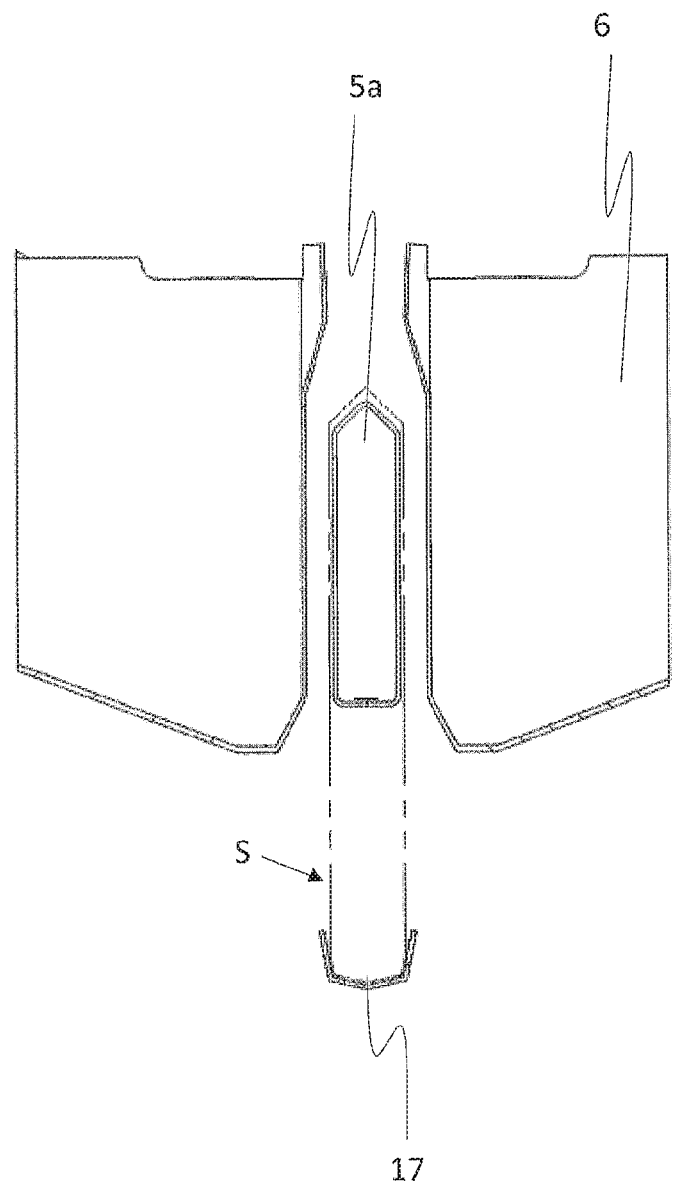
FIG. 7 shows a cross-sectional view of a frame arm and a discharge channel provided below.

FIG. 7 shows a cross-section of a discharge channel 17, which is in this case arranged below a frame arm 5a. It can be seen that the bad water which is coming from the central collection container 11 (not shown here) can be led out of the collection funnel 6. Furthermore, water which flows downwards from the frame arm 5a is collected by the discharge channel 17 and is also led outwards. In FIG. 7, inter alia also the pivoted areas of the frame arm 5a are presented.

Figure 8:
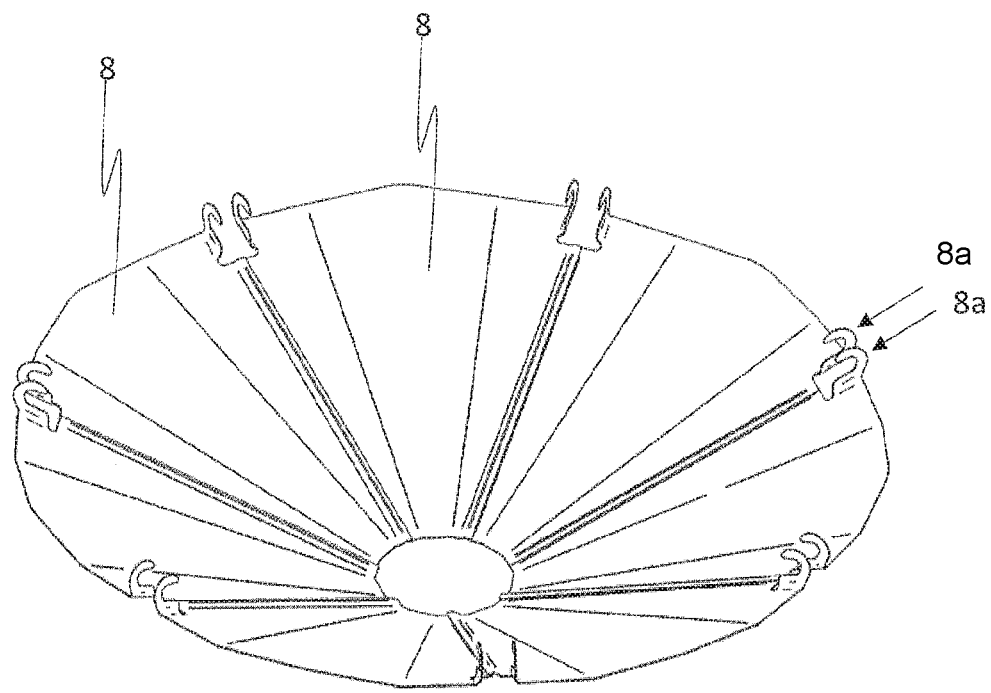
FIG. 8 shows a detailed view of connection chutes which are used in the first embodiment of the present invention.

FIG. 8 shows a view of collection chutes 8 according to the first embodiment of the invention.

The collection chutes 8 are held by holders 8a and hence can be separately removed for cleaning purposes. Furthermore, it can be gained from FIG. 8 that the collection chutes 8 overlap, ensuring that no bad water at the transition between individual collection chutes 8 can flow or drip downwards.

Figure 9:
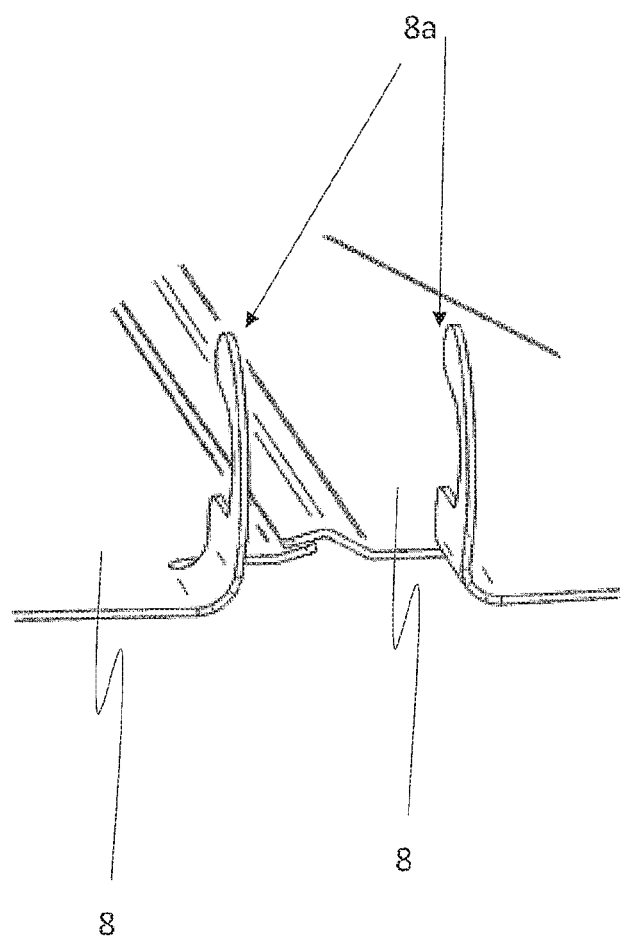
FIG. 9 shows a detailed view of the holders and the overlapping of two collection chutes of FIG. 8.

FIG. 9 again shows a detailed view of the overlapping of two collection chutes 8. Furthermore, the holders 8a are again presented more in detail.

Figure 10:
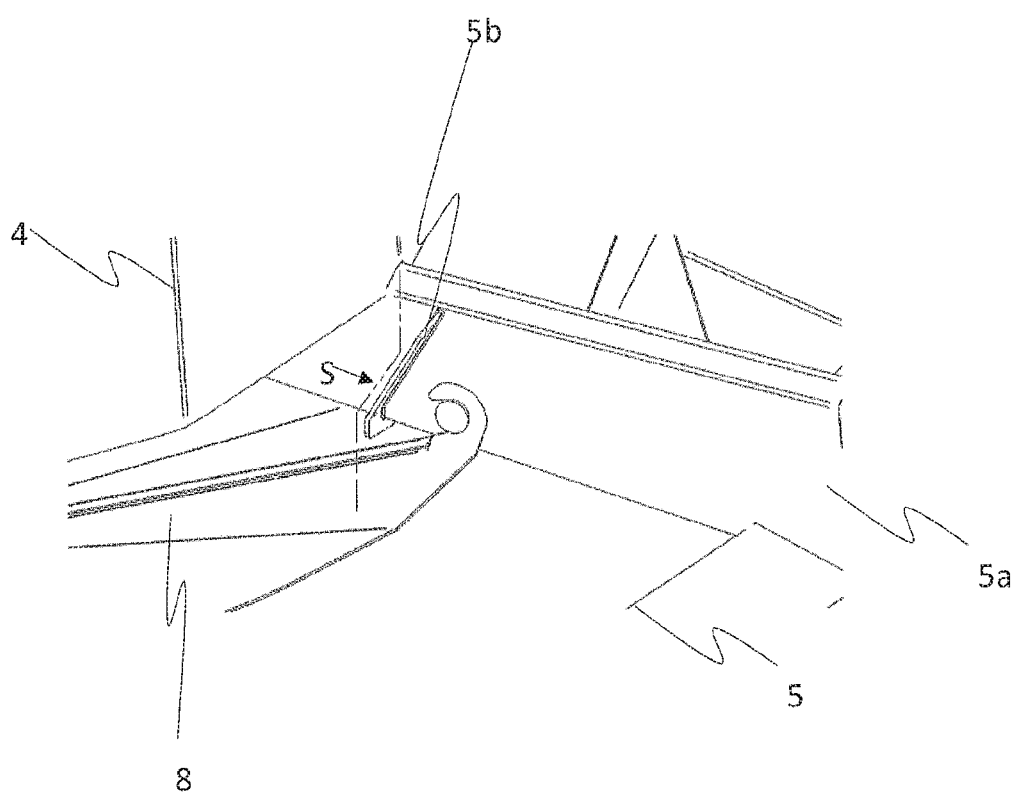
FIG. 10 shows a detailed view of a discharge plate at a frame arm and its transition into a collection chute (or collection container), as for example used in the first (or third) embodiment of the present invention.

FIG. 10 shows a further discharge plate 5b at the frame arm 5a, which again is fixed to the frame 5. This discharge plate 5b is connected with the frame arm 5a in a secure and sealed manner and is above the collection chutes 8. The discharge plate 5b has slightly pivoted lateral areas and tapers downwards in an acute manner in order to form a targeted drip position. The discharge plate 5b leads bad water (cf. bad water flow S) away, which gets from the cage 4 to the frame arm 5a. By the pivoted lower surface of the frame arm 5a (the frame arm 5a has a pivoting from the cage 4 to the frame 5) the bad water is led to the discharge plate 5b, and from there further to the collection chutes 8. Hence, no bad water can get further downwards into the product-conducting area, for example into the collection funnel 6 (not shown here).

Figure 11:
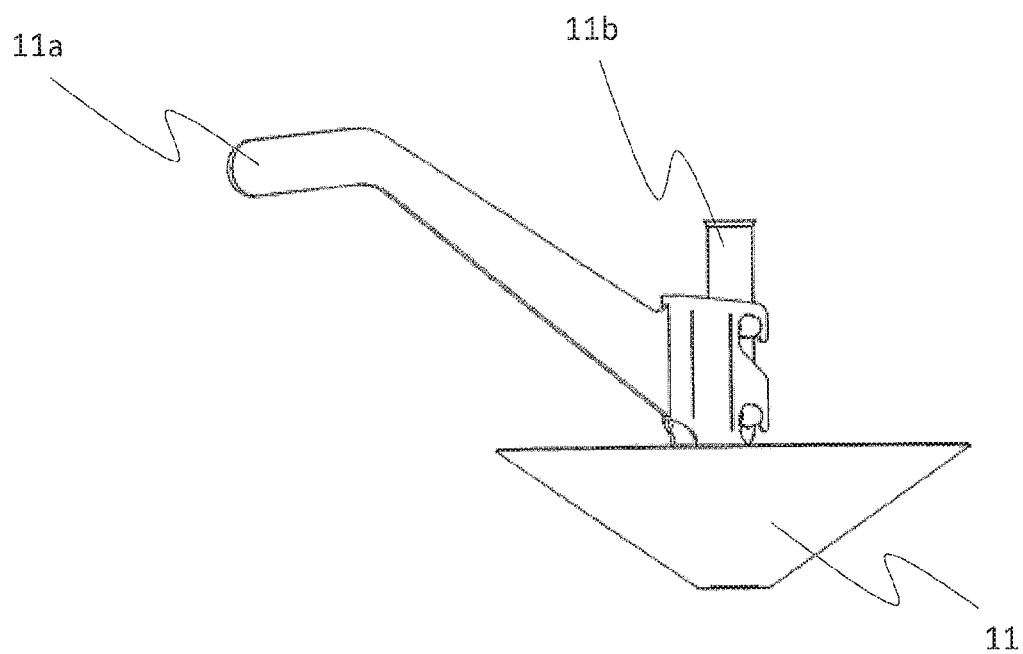
FIG. 11 shows a detailed view of a central collection container with fixation to the cage.

FIG. 11 shows a view of a central collection container 11. The collection container 11 contains a grip 11a and a rotation part 11b in the middle. Grip 11a and collection container 11 are securely fixed to each other. The rotation member 11b is screwed to the cage 4 (not shown here) and can preferentially also be used as discharge screw. Bad water can be collected in the collection container 11. The collection container 11 can be hung out via the grip 11a in order to drain bad water.

Figure 12:
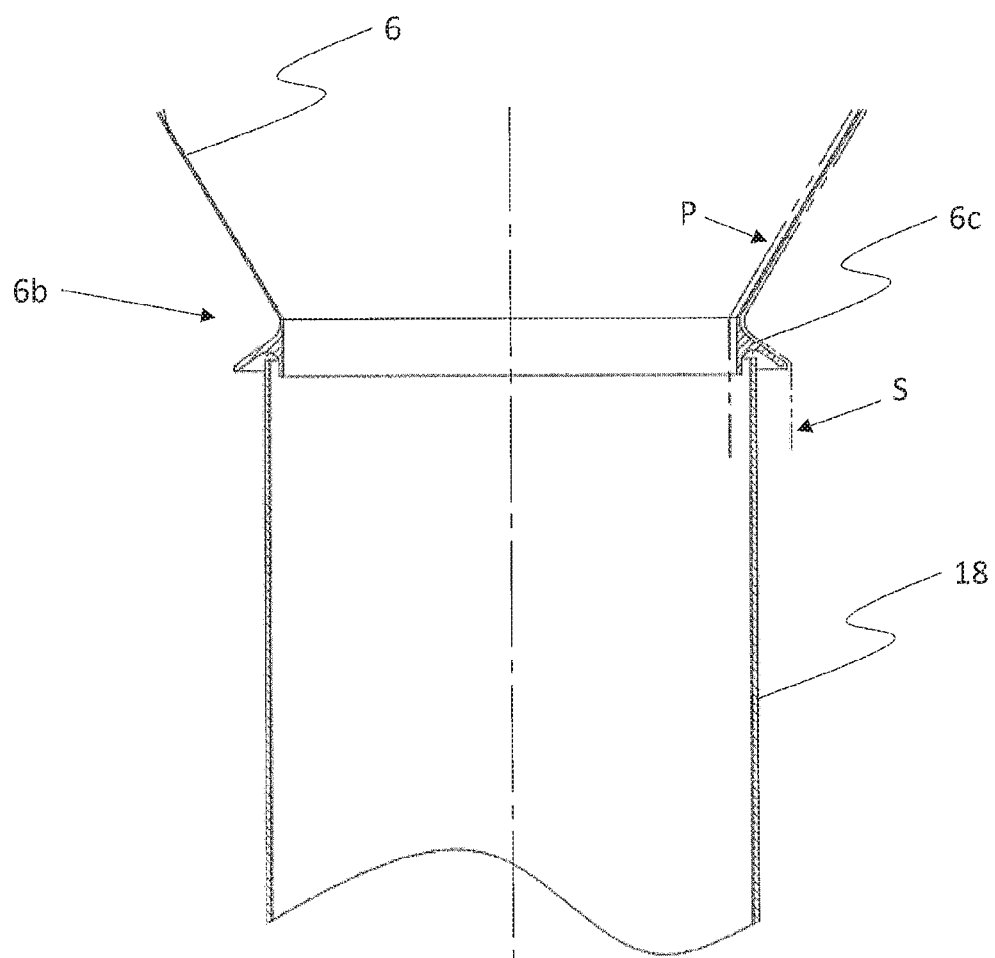
FIG. 12 shows one embodiment of the collection funnel with which a tube is connected via a flange.

FIG. 12 shows a cross-sectional view of the flange 6b, which connects a pipe 18 with the collection funnel 6. The collection funnel 6 is herein welded with a specially formed hygienic funnel-related rotating member 6c. The funnel-related rotating member 6c overlaps the pipe insofar that no bad water can get inwards or no product can get outwards. The funnel-related rotating member 6c and the pipe 18 are not connected to each other. The product flow is presented by P as in FIG. 12, the bad water flow by S.

Figure 13:
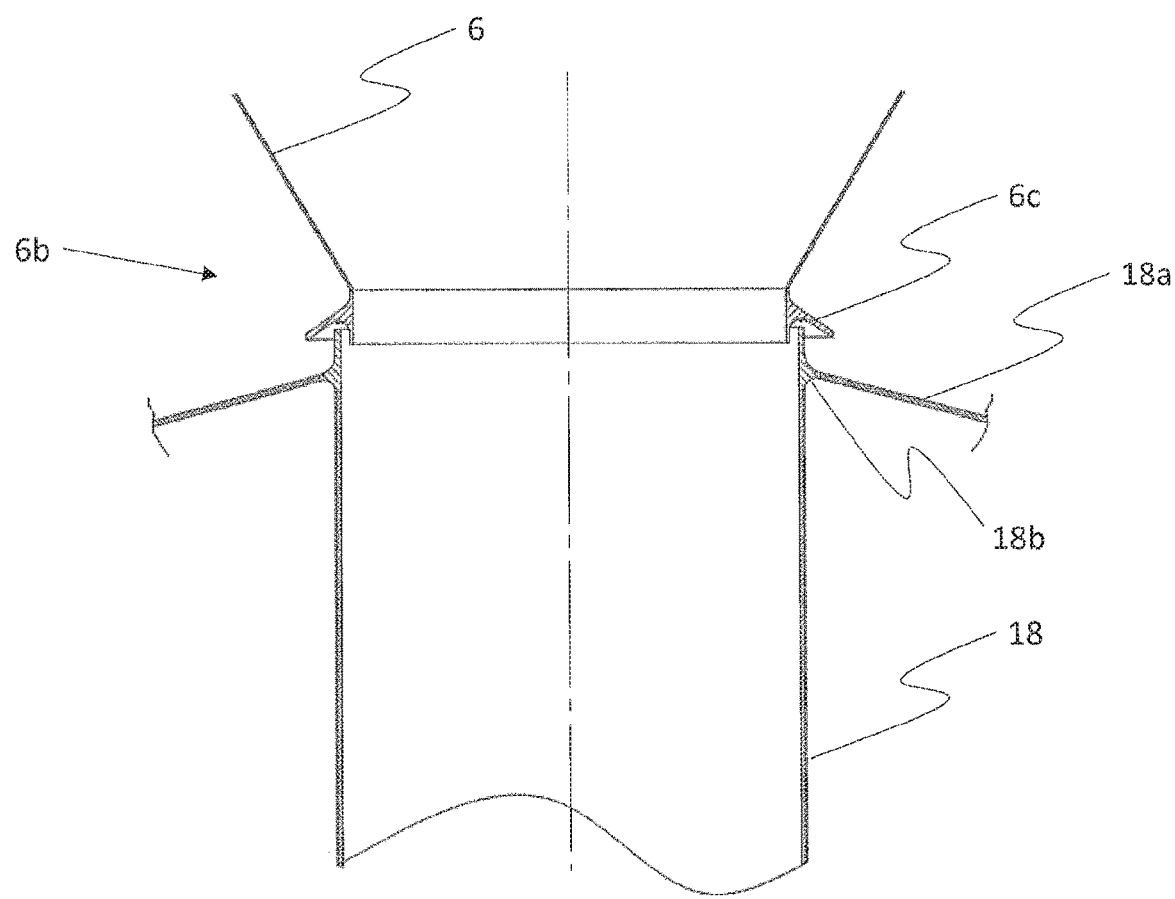
FIG. 13 shows a further embodiment of a flange, which connects a collection funnel and a tube with a drip tray.

FIG. 13 shows a further embodiment of the connection of the collection funnel 6 with a pipe 18 via a funnel flange 6b. Furthermore, a pivoted plate 18a is connected at the outer side of the pipe 18 via a further rotating member 18b. The additional rotating member 18b is also hygienically designed. The funnel-related rotating member 6c and the pipe-related rotating member 18b are not connected to each other.

Figure 14:
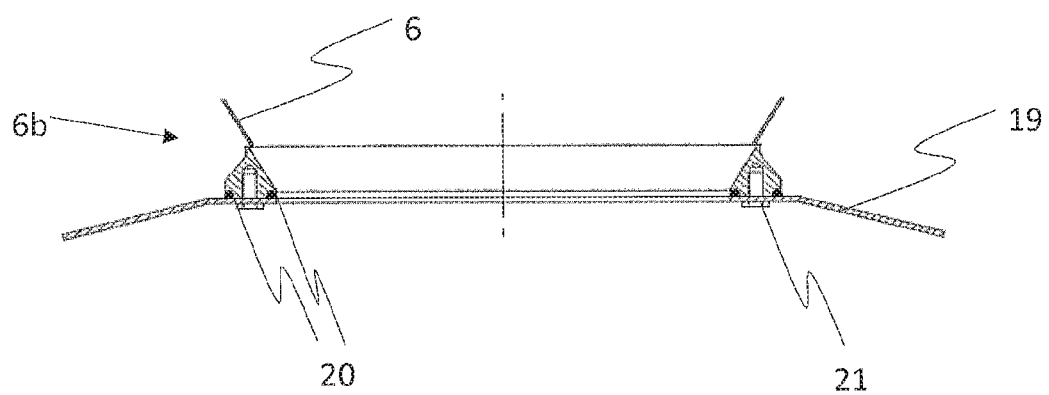
FIG. 14 shows a further embodiment of a flange for the connection of a chute or a funnel with a bulkhead plate or a drip tray.

In FIG. 14, a further flange connection 6b between a collection funnel 6 and a pipe 18 (not shown here) is presented. Herein, a pivoted plate 19 is connected to the flange 6b by screws 21, wherein sealing elements 20 to the inner and outer side are present.

Figure 15:
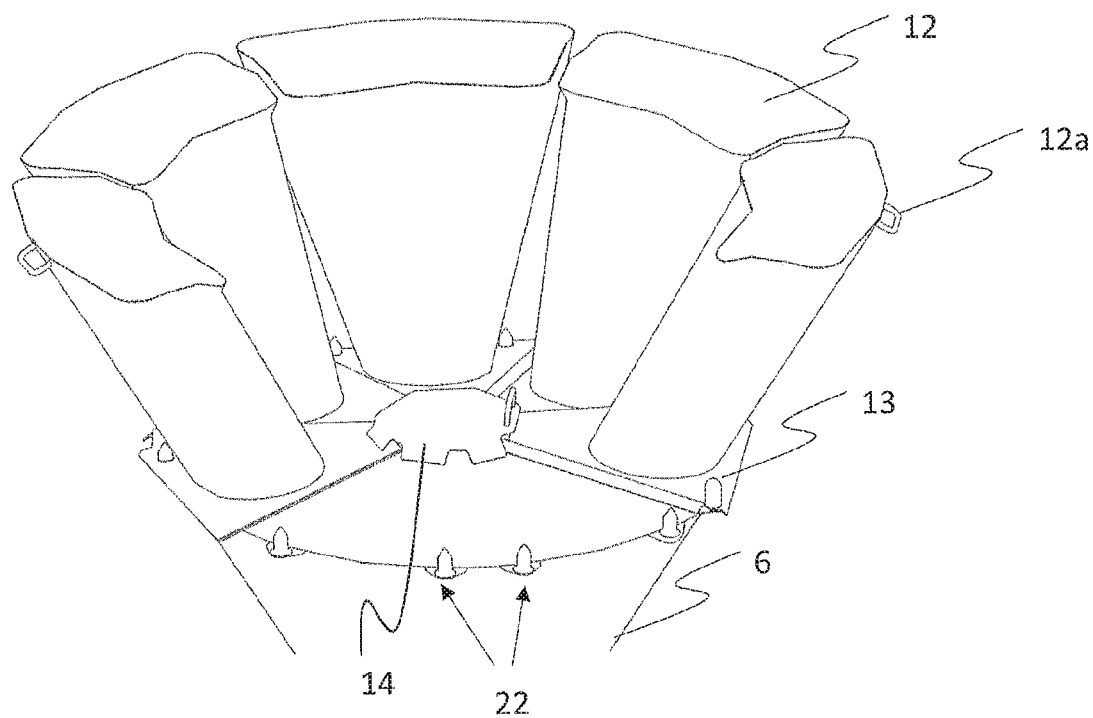
FIG. 15 shows a detailed view of tubular chutes with pivoted bulkhead plates and central cover according to the second embodiment of the present invention.

In FIG. 15, a detailed view of tubular chutes 12 according to the second embodiment of the invention is shown. Each tubular chute 12 is fixedly connected with a bulkhead plate 13, for example welded, connected by screws or glued or generated via casting or generating processes. Grip pieces 12a at the chutes 12 serve to enable removing of the units of tubular chutes 12 and bulkhead plates 13. The bulkhead plates 13 lie, pivoted to the outer side, on the collection funnel 6. In the center of the collection funnel 6, there is further a central cover 14, which lies on the bulkhead plates 13. Furthermore, bolts 22 are fixed to the funnel 6, into which the bulkhead plates 13 can be mounted.

Figure 16:
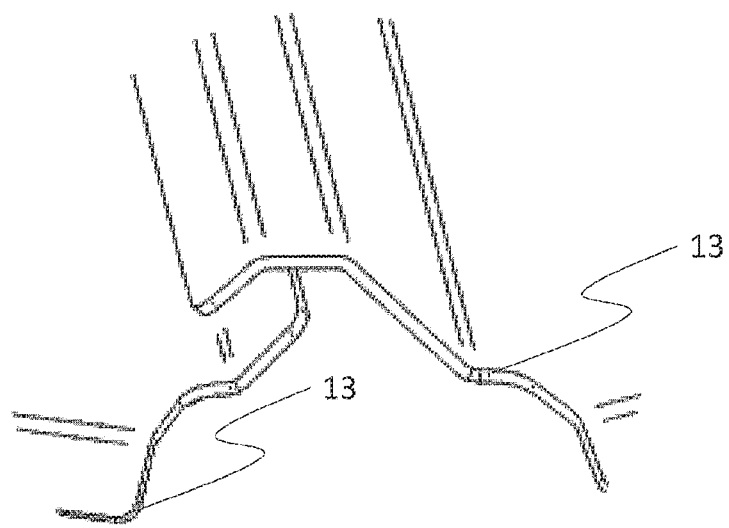
FIG. 16 shows an enlarged view of the overlapping of bulkhead plates according to the second embodiment of the present invention.

FIG. 16 is a detailed view of two bulkhead plates 13 as presented in FIG. 15, wherein it becomes apparent how those overlap each other, so that no bad water can flow down or drop between the bulkhead plates 13.

Figure 17:
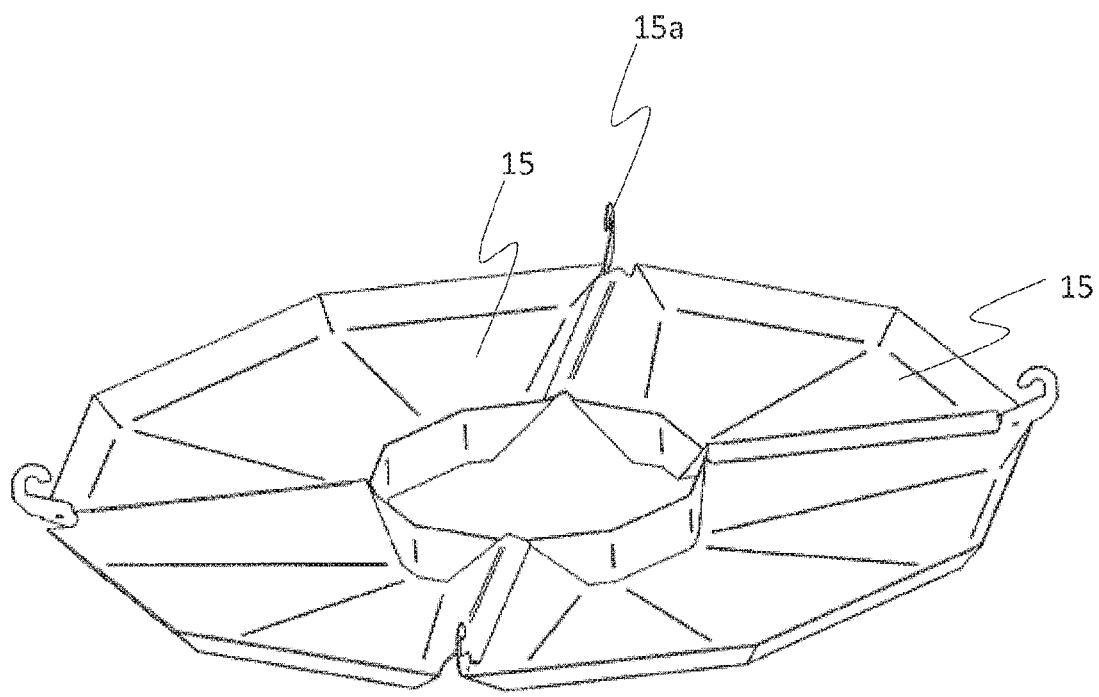
FIG. 17 shows a view of lateral collection containers according to the third embodiment of the present invention.

In FIG. 17, lateral collection containers 15 according to the third embodiment of the invention are presented. These lateral collection containers 15 overlap each other and are further provided with holders 15a. These lateral collection containers 15 form containers, in which water can be collected, without the possibility to be drained again. The lateral collection containers 15 have hence to be unmounted in order to be drained.

Figure 18:
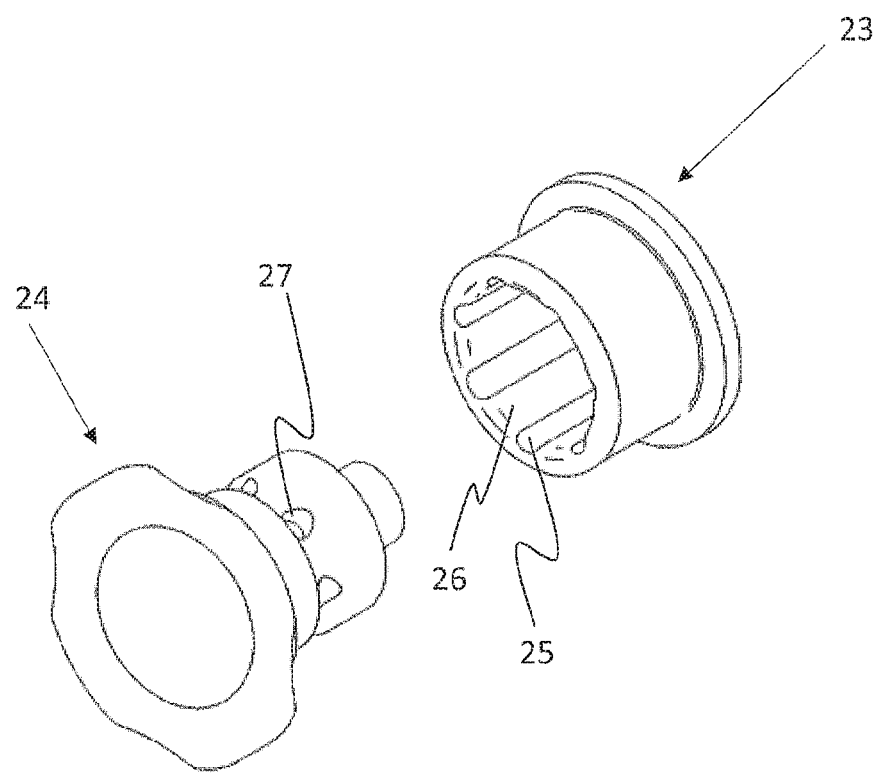
FIG. 18 shows an embodiment of a flushable bearing seat.

FIG. 18 shows hygienically designed plain bearing bushings which can be used in all embodiments of the present invention. These consist of a plain bearing bushing 23 and a plain bearing bushing grip 24. In the plain bearing bushing grip 24, flush drillings 27 are present, wherein in the plain bearing bushings 23, there are water-conducting sections 25 between bearing seats 26. Via these flush drillings 27 and the water-conducting sections 25, cleaning water can be flushed, whereby the plain bearing bushings 23 and the plain bearing bushing grip 24 can be liberated from contaminations.

Figure 19:
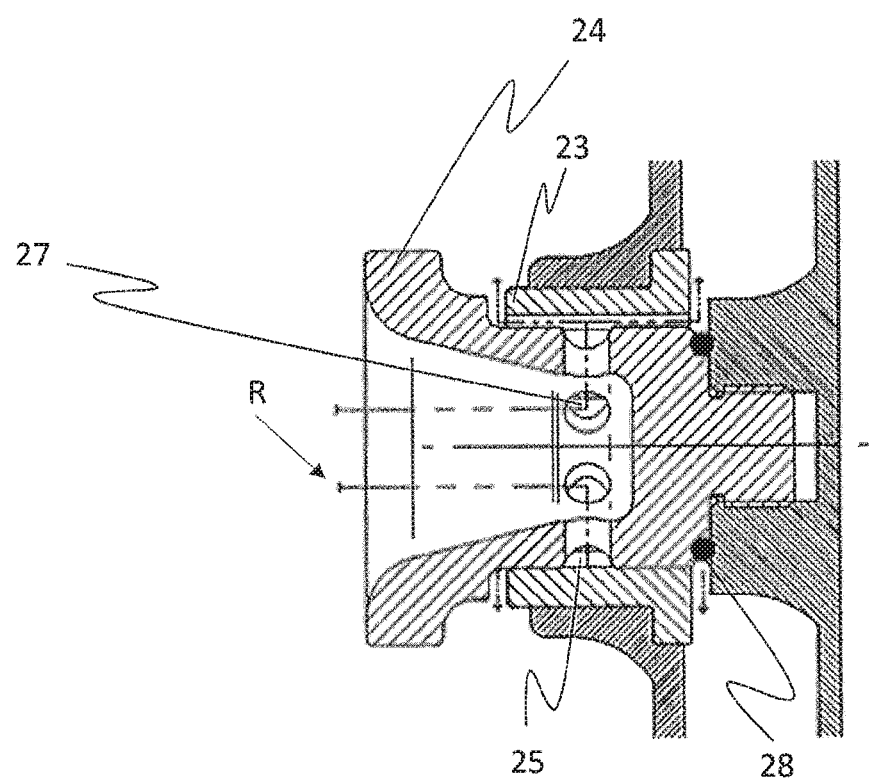
FIG. 19 shows a cross-sectional view of a bearing seat of FIG. 18 in the mounted state.

In FIG. 19, a cross-sectional view of the plain bearing bushing 23 and the plain bearing bushing grip 24 in a mounted state are presented. Flush drillings 27 and water-conducting sections 25 are in fluid communication.

Herein, also a cleaning agent flow R is presented. This cleaning water gets through the plain bearing bushing grip 24 through the flush drillings 27, where it is led to the outer side through the water-conducting sections 25 of the plain bearing bushing 23. Furthermore, the plain bearing is provided with seals 28. The water-conducting sections 25 are arranged within the bearing seat 26.

The plain bearing bushing grip 24 is screwed, and the screws are sealed via the sealing elements 28. In the plain bearing bushing grip 24, cleaning water can be injected with a higher pressure on the inner side, and this cleaning water flows through a flush drilling 27 and hence also in the sections of the bearing seat 25 and leaves the bearing bushing 23 on both sides in axial direction. Hence, contaminations within the bearing and also besides the bearing can be effectively removed.

Figure 20:
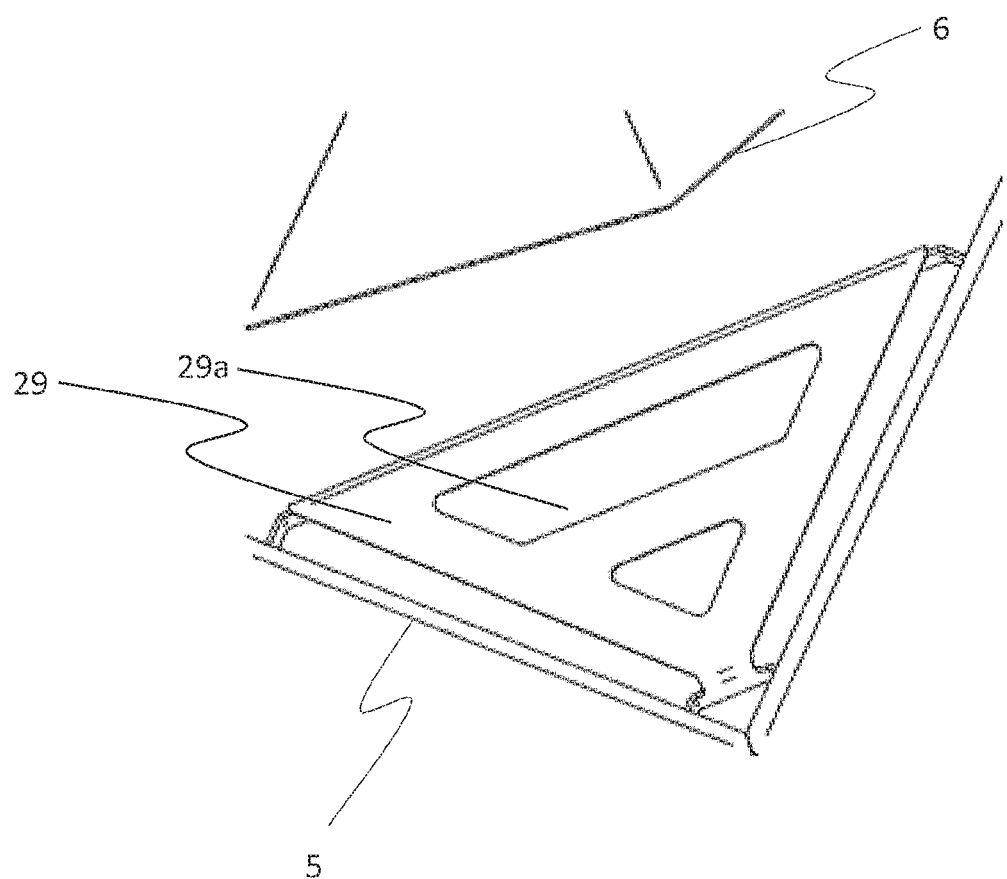
FIG. 20 shows an embodiment of a hygienic step according to the present invention.

In FIG. 20, a hygienic step 29 can be seen, which is connected to the frame 5 and is pivoted to the outer side at the corner of the frame 5. The step 29 has a distance to the frame 5. In particular at the corner, there is a particularly large distance, where water can be drained in an efficient way. Via sections 29a in the step 29, furthermore the area is reduced on which bad water can accumulate. That step 29 is mounted in the proximity of the collection funnel 6.

Figure 21:
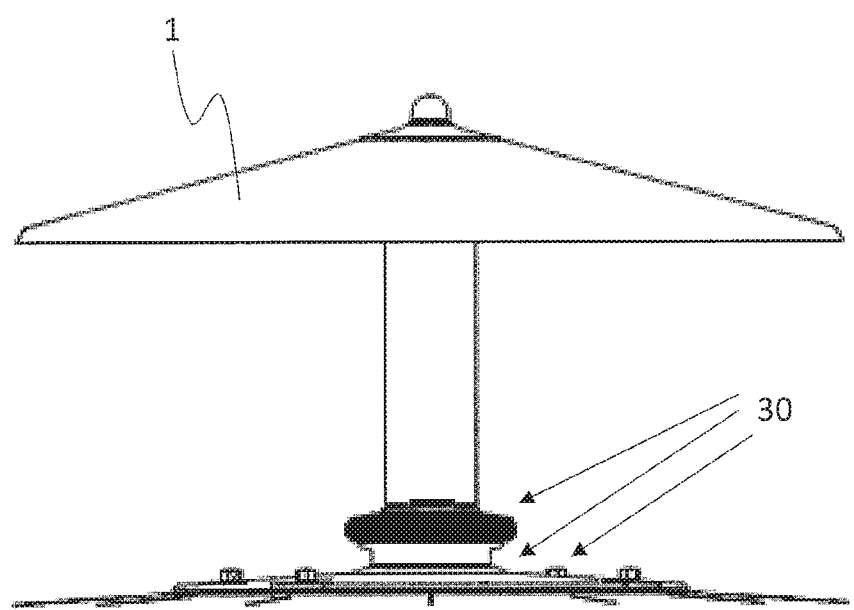
FIG. 21 shows an embodiment of a hygienically sealed distribution plate which can be cleaned without demounting, according to the present invention.

FIG. 21 shows a hygienic distribution plate 1 in enlarged view, wherein multiple seal elements 30 are arranged, what enables a simple and quick cleaning. The distribution plate 1 hence does not have to be demounted from the machine for cleaning purposes.

The present invention is not limited to the above-mentioned embodiments. For example, in addition or instead of the overlapping of bulkhead plates 13 or the lateral collection containers 15 or also collection chutes 8, a rubber sealing can be arranged between these areas.

Furthermore, the draining of bad water from the central collection container 11 does not necessarily have to be performed via discharge channels 17, but could, for example, also be performed via pipes or tubes. Furthermore, for example also pumps could be provided, with which water from the collection container 11 and lateral collection containers 15 could be pumped.

Furthermore, pivoted areas could be mounted also at different parts of a combination scale, so that the bad water flow S can be separated from the product flow P.

Furthermore, a flange connection as shown in FIG. 14 could also be used for tubular chutes 12 and bulkhead plates 13.

The invention claimed is:

1. Bad water discharge system of a weighing system,
   wherein the weighing system comprises a distribution plate, at least one feeding device, at least one reserve container, at least one weighing container and at least one collection funnel, which conduct product,
   wherein the at least one reserve container and the at least one weighing container are fixed to a cage and the at least one collection funnel is fixed to a frame, wherein the cage comprises pivoted upper and lower surfaces,
   at least one feeding device-discharge plate is disposed at the lower surface of the feeding device in a way that it leads bad water away from at least one reserve container to a sidewall of the cage,
   so that the bad water originating from the upper surface of the cage and from the lower surface of the feeding device is bundled into one flow and is collected below the cage in suitable collection devices, which are disposed above the collection funnel so that no bad water can get into the collection funnel.

2. Bad water discharge system of a weighing system according to claim 1, wherein bad water is led via at least one reserve container holder to a side wall of the cage.

3. Bad water discharge system of a weighing system according to claim 1, wherein one dripping edge from the upper surface of the cage is designed without projection, but finishes flushly with the side area of the cage.

4. Bad water discharge system of a weighing system according to claim 1, wherein a pivoted protective roof is provided above the weighing system.

5. Bad water discharge system of a weighing system according to claim 1, wherein at least one collection chute and one substantially central collection container are provided as collection devices, wherein the at least one collection chute is pivoted obliquely with regard to the collection container.

6. Bad water discharge system of a weighing system according to claim 5, wherein pivoted discharge channels are provided in a way that they lead out of the collection container, in order to drain bad water to the outside.

7. Bad water discharge system of a weighing system according to claim 6, wherein the pivoted discharge channels are provided below frame arms with a pivoted surface, which connect the collection funnel and the frame.

8. Bad water discharge system of a weighing system according to claim 5, wherein several collection chutes are provided, which are aligned in an overlapping manner.

9. Bad water discharge system of a weighing system according to claim 1, wherein the tubular chutes are provided for the product, and several bulkhead plates, which are pivoted to the outside, are provided as collection devices for bad water, and are respectively fixedly connected with the tubular chute, wherein the bulkhead plates lie on the collection funnel, and wherein a central cover is provided.

10. Bad water discharge system of a weighing system according to claim 9, wherein the bulkhead plates are respectively aligned in an overlapping manner.

11. Bad water discharge system of a weighing system according to claim 1, wherein lateral collection containers are provided as collection devices.

12. Bad water discharge system of a weighing system according to claim 11, wherein a substantially central collection container is provided as further collection device.

13. Bad water discharge system of a weighing system according to claim 1, wherein a funnel flange is mounted on the collection funnel, with which a drip tray, which is pivoted to the outside, can be connected.

14. Bad water discharge system of a weighing system according to claim 13, wherein a pipe is mounted at the lower end of the collection funnel at the funnel flange, in which product is conducted, wherein the pipe is connected with a pipe-flange and a pivoted plate.

15. Bad water discharge system of a weighing system according to claim 1, containing at least one system consisting of plain bearing bush and plain bearing bush grip, wherein flush drillings are present in the plain bearing bush grip, and water-conducting sections between bearing seats are present in the plain bearing bushes, wherein flush drillings and water-conducting sections are in fluid communication.

16. Bad water discharge system of a weighing system according to claim 1, wherein a step is provided on the frame, which is not aligned horizontally, which has a distance from the frame, and in which at least one section is provided.

17. Bad water discharge system of a weighing system according to claim 1, wherein the distribution plate is at least provided with one sealing element.

18. Bad water discharge system of a weighing system according to claim 1, wherein the reserve container holder is obliquely pivoted into the direction of the cage.

\* \* \* \* \*